United States Patent
Lee et al.

(10) Patent No.: US 8,520,367 B2
(45) Date of Patent: Aug. 27, 2013

(54) METHOD OF MANUFACTURING LITHIUM ION CAPACITOR AND LITHIUM ION CAPACITOR MANUFACTURED USING THE SAME

(75) Inventors: Sang Kyun Lee, Gyeonggi-do (KR); Ji Sung Cho, Gyeonggi-do (KR); Bae Kyun Kim, Gyeonggi-do (KR); Hong Seok Min, Gyeonggi-do (KR); Dong Hyeok Choi, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 259 days.

(21) Appl. No.: 13/018,859

(22) Filed: Feb. 1, 2011

(65) Prior Publication Data
US 2012/0050953 A1    Mar. 1, 2012

(30) Foreign Application Priority Data
Aug. 31, 2010    (KR) .................. 10-2010-0084820

(51) Int. Cl.
*H01G 9/04*    (2006.01)
(52) U.S. Cl.
USPC .......... 361/528; 361/523; 361/252; 361/529; 361/517; 361/519
(58) Field of Classification Search
USPC ............... 361/528, 523, 525, 529, 509–512, 361/502–503, 516–519
See application file for complete search history.

(56) References Cited

U.S. PATENT DOCUMENTS
7,848,081 B2 * 12/2010 Tanizaki et al. ............... 361/525

FOREIGN PATENT DOCUMENTS
| JP | 11-086847 | | 3/1999 |
| JP | 2002-231221 | A | 8/2002 |
| JP | 2002-260971 | A | 9/2002 |
| JP | 2009-054712 | A | 3/2009 |
| JP | 2009-141114 | A | 6/2009 |
| KR | 10-2008-0080134 | A | 9/2008 |

OTHER PUBLICATIONS

Korean Office Action issued in Korean Application No. 10-2010-0084820 issued on Oct. 21, 2011.
Korean Notice of Allowance issued in Korean Application No. 10-2010-0084820 issued on Apr. 9, 2012.

* cited by examiner

*Primary Examiner* — Nguyen T Ha
(74) *Attorney, Agent, or Firm* — McDermott Will & Emery LLP

(57) ABSTRACT

Provided are a method of manufacturing a lithium ion capacitor and a lithium ion capacitor manufactured using the same. The method of manufacturing a lithium ion capacitor includes forming a lithium thin film on one surface of a separator; making the lithium thin film in contact with an anode, and alternately disposing the anode and a cathode with the separator interposed therebetween to form an electrode cell; and enclosing the electrode cell and an electrolyte into a housing, and pre-doping lithium ions to the anode from the lithium thin film.

6 Claims, 4 Drawing Sheets

METHOD OF MANUFACTURING LITHIUM ION CAPACITOR AND LITHIUM ION CAPACITOR MANUFACTURED USING THE SAME

CROSS-REFERENCE(S) TO RELATED APPLICATIONS

This application claims the benefit under 35 U.S.C Section [120, 119, 119(e)] of Korean Patent Application Serial No. 10-2010-0084820, entitled METHOD OF MANUFACTURING LITHIUM ION CAPACITOR AND LITHIUM ION CAPACITOR MANUFACTURED USING THE SAME filed on Aug. 31, 2010, which is hereby reference in its entirety into this application.

BACKGROUND OF THE INVENTION

1. Field of the Invention

The present invention relates to a lithium ion capacitor, and more particularly, to a method of manufacturing a lithium ion capacitor in which a lithium ion pre-doping process of an anode is performed using a separator having a lithium thin film disposed on one surface thereof, and a lithium ion capacitor manufactured using the same.

2. Description of the Related Art

In general, electrochemical energy storage devices are core parts of end-products, which are essentially used in mobile information communication devices, and mobile electronic devices. In addition, the electrochemical energy storage devices will be securely used as high quality energy sources in a renewable energy system that can be applied to future electric vehicles, mobile electronic terminals, and so on.

An electrochemical capacitor, among the electrochemical energy storage devices, may be classified as an electrical double layer capacitor using an electrical double layer theory and a hybrid supercapacitor using electrochemical oxidation-reduction reaction.

Here, while the electrical double layer capacitor is widely used in a field in which high output energy characteristics are needed, the electrical double layer capacitor has problems such as a small capacity, and so on. On the other hand, research on the hybrid supercapacitor is actively performed to improve capacitive characteristics of the electrical double layer capacitor.

In particular, a lithium ion capacitor (LIC), among the hybrid supercapacitors, has an anode doped with lithium ions to have a charge capacity three to four times of the electrical double layer capacitor, providing large energy density.

Here, in a process of pre-doping an anode with lithium ions, lithium metal films are disposed on an uppermost layer and a lowermost layer of an electrode cell, and then, the electrode cell is immersed in an electrolyte. At this time, since the lithium films are disposed on both ends of the electrode cell, lithium ions may be non-uniformly doped to the laminated anode. In addition, since the lithium metal film may remain after the pre-doping process, lithium metal may be extracted during an operation of the lithium ion capacitor to decrease reliability of the lithium ion capacitor.

Further, since about twenty days are required until the lithium ions are uniformly doped to the anode provided in the electrode cell, it is difficult to apply the process to mass production. That is, while the lithium ion capacitor needs a pre-doping process to the anode to improve capacitive characteristics, reliability of the lithium ion capacitor may be decreased due to the pre-doping process to the anode or it is difficult to apply the process to mass production.

Therefore, in order to apply the lithium ion capacitor having high capacity to mass production, a new anode pre-doping process capable of uniformly and rapidly doping lithium ions to the anode is needed.

SUMMARY OF THE INVENTION

The present invention has been invented in order to overcome the above-described problems and it is, therefore, an object of the present invention to provide a method of manufacturing a lithium ion capacitor including a lithium ion pre-doping process of an anode using a separator having a lithium film disposed on one surface thereof, and a lithium ion capacitor manufactured using the same.

In accordance with one aspect of the present invention to achieve the object, there is provided a method of manufacturing a lithium ion capacitor, including forming a lithium thin film on one surface of a separator; making the lithium thin film in contact with an anode, and alternately disposing the anode and a cathode with the separator interposed therebetween to form an electrode cell; and enclosing the electrode cell and an electrolyte into a housing, and pre-doping lithium ions to the anode from the lithium thin film.

Here, the anode may include an anode current collector and an anode active material layer disposed on one surface of the anode current collector.

In addition, in making the lithium thin film in contact with the anode, and alternately disposing the anode and the cathode with the separator interposed therebetween to form the electrode cell, the anode current collector may be in contact with the lithium thin film.

Further, the anode current collector may have a mesh type having a plurality of through-holes.

Furthermore, the cathode may include a cathode current collector and cathode active material layers disposed on both surfaces of the cathode current collector.

In addition, the cathode current collector may have a sheet shape with no hole.

Further, the lithium thin film may have a thickness range of 1 to 10 μm.

Furthermore, in forming the lithium thin film on one surface of the separator, the lithium thin film may be formed through a vacuum vapor deposition method.

In accordance with one aspect of the present invention to achieve the object, there is provided a lithium ion capacitor including a cathode and an anode alternately disposed with a separator interposed therebetween, wherein the cathode includes a cathode current collector with no hole and cathode active material layer disposed on both surfaces of the cathode current collector, and the anode includes an anode current collector and an anode active material layer disposed on one surface of the anode current collector.

Here, the anode active material layer may be doped with lithium ions.

In addition, the anode active material layer may include at least one of natural graphite, synthetic graphite, graphite carbon fiber, non-graphite carbon, and carbon nanotube.

Further, the anode active material layer may include activated carbon.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
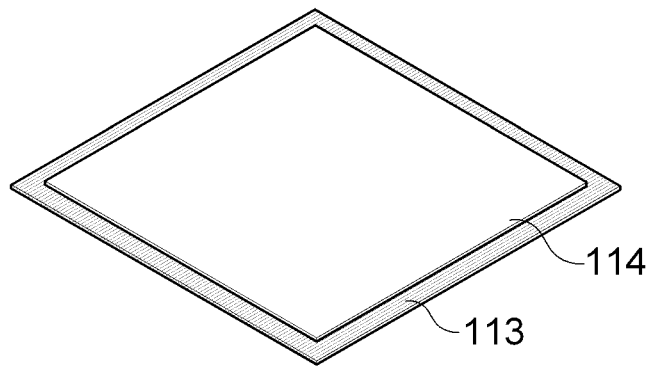
FIGS. 1 to 6 are perspective views for explaining a method of manufacturing a lithium ion capacitor in accordance with a first exemplary embodiment of the present invention.

Hereinafter, embodiments of the present invention for a lithium ion capacitor will be described in detail with reference to the accompanying drawings. The following embodiments are provided as examples to fully convey the spirit of the invention to those skilled in the art.

Therefore, the present invention should not be construed as limited to the embodiments set forth herein and may be embodied in different forms. And, the size and the thickness of an apparatus may be overdrawn in the drawings for the convenience of explanation. The same components are represented by the same reference numerals hereinafter.

FIGS. 1 to 6 are perspective views for explaining a method of manufacturing a lithium ion capacitor in accordance with a first exemplary embodiment of the present invention.

Referring to FIG. 1, in order to manufacture a lithium ion capacitor 100, first, a lithium film 114 is formed on one surface of a separator 113.

Here, the separator 113 may function to electrically separate an anode 112 and a cathode 111, which will be described below. The separator 113 may have a porous structure through which ions can migrate. While the separator 113 may be formed of a material such as paper, non-woven fabric, cellulose-based resin, and so on, the separator 113 of the embodiment of the present invention is not limited thereto.

The lithium thin film 114 may function as a source for supplying lithium ions to the anode 112, which will be described below. Here, the lithium thin film 114 may be formed through a vacuum deposition method. At this time, the lithium thin film 114 may have a thickness of 1 to 10 μm. Here, when the thickness of the lithium thin film is less than 1 μm, since an amount of the lithium to be doped to the anode 112 is too small and a contact resistance between an anode active material layer 112b and the lithium thin film 114 may be increased, the pre-doping process may not be smoothly performed. On the other hand, when the thickness of the lithium thin film is more than 10 μm, the lithium may remain on the separator 113 after performing the pre-doping process to the anode 112. Here, the thickness of the lithium thin film 114 is not limited thereto but may be varied according to a material or thickness of the anode 112.

Figure 2:
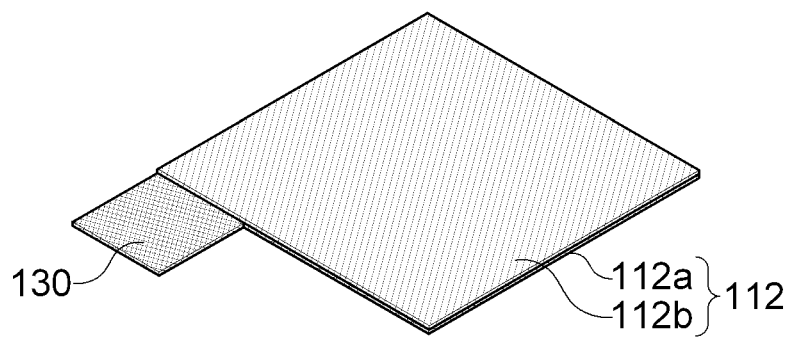

Referring to FIG. 2, the anode 112 is separately provided, in addition to formation of the lithium thin film 114 on the separator 113. The anode 112 may include an anode current collector 112a and an anode active material layer 112b disposed on one surface of the anode current collector 112a.

The anode current collector 112a may include any one of a metal, for example, copper, nickel and stainless steel. The anode current collector 112a may have a mesh shape having a plurality of through-holes for perform effective migration of ions and a uniform doping process.

The anode active material layer 112b may be formed of a carbon material to which lithium ions can be reversibly doped and undoped, for example, any one or mixed two or more selected from natural carbon, synthetic carbon, mesophase pitch based carbon fiber (MCF), mesocarbon microbead (MCMB), graphite whisker, graphite carbon fiber, non-graphite carbon, polyacene-based organic semiconductor, carbon nanotube, complex carbon material of a carbon material and a graphite material, a pyrolyzed material of furfuryl alcohol resin, a pyrolyzed material of novolac resin, and a pyrolyzed material of a condensation polycyclic carbon hydride such as pitch, cokes, and so on.

In addition, the anode active material layer 112b may further include a binder. Here, the binder may be formed of one or two or more selected from fluoride-based resin such as polytetrafluoroethylene (PTFE), polyvinylidene fluoride (PVdF), and so on, thermosetting resin such as polyimide, polyamidoimide, polyethylene (PE), polypropylene (PP), and so on, cellulose-based resin such as carboxymethyl cellulose (CMC), and so on, rubber-based resin such as styrenebutadiene rubber (SBR), and so on, ethylenepropylenediene monomer (EPDM), polydimethylsiloxane (PDMS), polyvinyl pyrrolidone (PVP), and so on.

In addition, the anode active material layer 112b may further include a conductive material, for example, carbon black, a solvent, and so on.

The anode 112 may include an anode terminal 130 to be connected to an external power supply. The anode terminal 130 may extend from the anode current collector 112a. Here, since the plurality of anode terminals 130 may extend from the anode current collectors 112, respectively, to be laminated, the laminated anode terminals 130 may be integrated by ultrasonic bonding to easily contact the external power supply. In addition, the anode terminal 130 may include a separate external terminal to be connected to the external terminal through bonding or welding.

Figure 3:
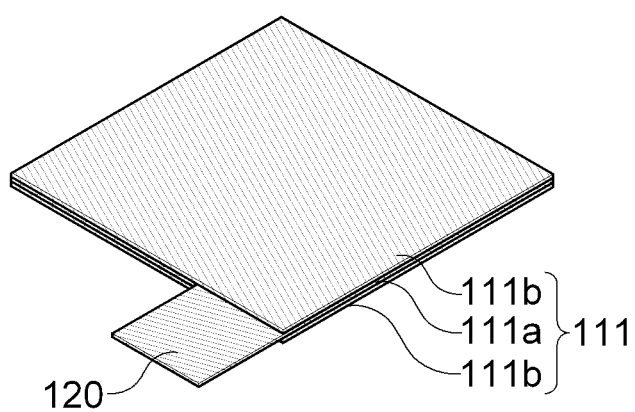

Referring to FIG. 3, in addition to provision of the anode, the cathode 111 is separately provided.

Here, the cathode 111 may include a cathode current collector 111a and cathode active material layers 111b disposed on both surfaces of the cathode current collector 111a.

The cathode current collector 111a may be formed of any one selected from aluminum, stainless steel, copper, nickel, titanium, tantalum and niobium. The cathode current collector 111a may have a sheet shape having no hole. Since the lithium thin film is in direct contact with the anode to perform a pre-doping process during the following process, there is no need of forming a through-hole, through which lithium ions migrate, in the cathode current collector 111a. Accordingly, since the cathode current collector 111a has a sheet shape with no hole, internal resistance of the lithium ion capacitor can be reduced.

The cathode active material layer 111b may include a carbon material to which ions can be reversibly doped and undoped, i.e., activated carbon. In addition, the cathode active material layer 111b may further include a binder. Here, the binder may be formed of one or two or more selected from fluoride-based resin such as polytetrafluoroethylene (PTFE), polyvinylidene fluoride (PVdF), and so on, thermosetting resin such as polyimide, polyamidoimide, polyethylene (PE), polypropylene (PP), and so on, cellulose-based resin such as carboxymethyl cellulose (CMC), and so on, rubber-based resin such as styrenebutadiene rubber (SBR), and so on, ethylenepropylenediene monomer (EPDM), polydimethylsiloxane (PDMS), polyvinyl pyrrolidone (PVP), and so on. In addition, the cathode active material layer 111b may further include a conductive material, for example, carbon black, a solvent, and so on.

Here, the cathode 111 may include a cathode terminal 120 to be connected to an external power supply. The cathode terminal 120 may be formed by bonding a separate terminal, or may extend from the cathode current collector 111a of the cathode 111.

Figure 4:
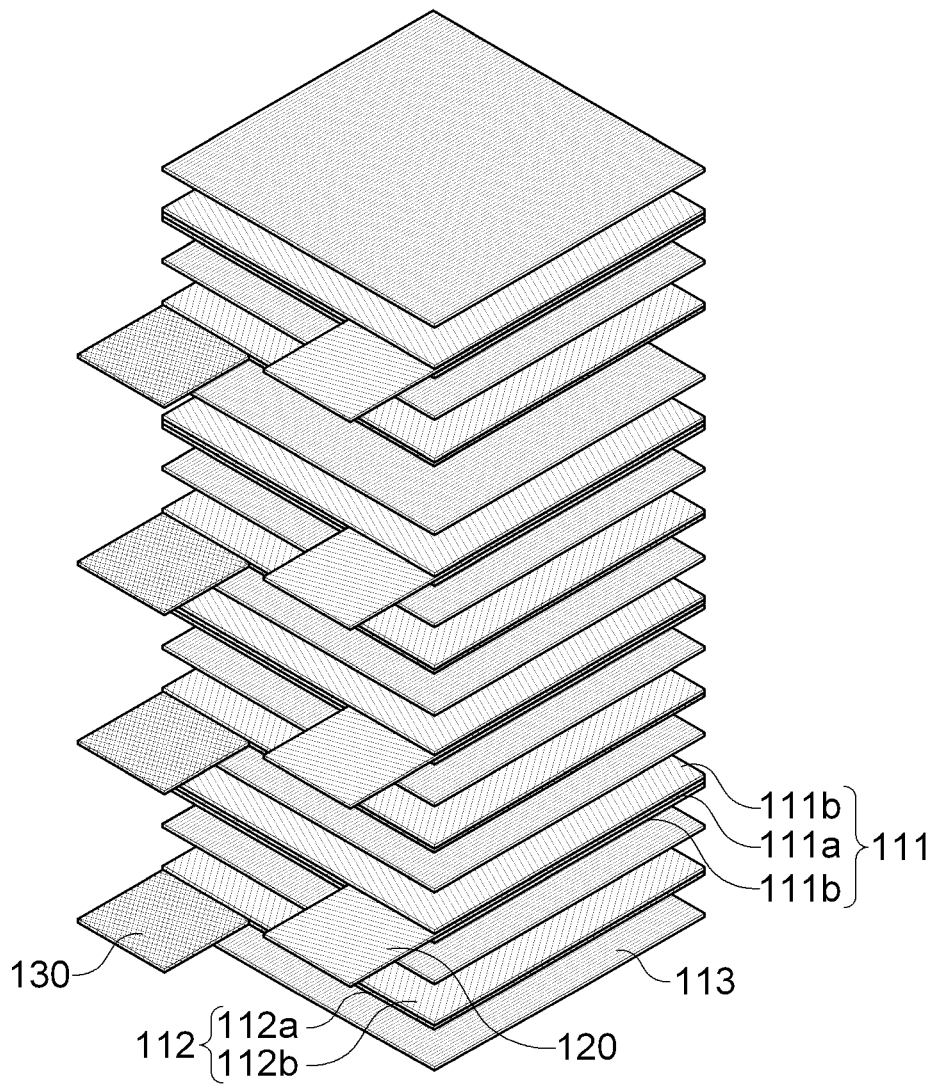

Referring to FIG. 4, after providing the separators 113 having the lithium thin films 114, the cathodes 111 and the anodes 112, the cathodes 111 and the anodes 112 are sequentially disposed with the separators 113 disposed therebetween to form an electrode cell 110. Here, in order to pre-dope lithium ions to the anode 112, the lithium thin film 114 of the separator 113 is in contact with the anode current collector 112a of the anode 112. Since the anode active material layer 112b is formed of a carbon material, when the anode active material layer 112b is in direct contact with the lithium thin film 114, it is difficult to dope the lithium ions to the anode active material layer 112b due to generation of resistance. At this time, the anode current collector 112a formed of a conductive material is in contact with the lithium thin film 114 to dope the lithium ions to the anode active material layer 112b to reduce resistance during the doping, uniformly doping the lithium ions to the anode active material layer 112b.

While the electrode cell 110 has been shown described as a pouch-type in this embodiment, the electrode cell 110 is not limited thereto but may be a wound type in which the cathode 111, the anode 112 and the separator 113 are wound in a roll shape.

Figure 5:
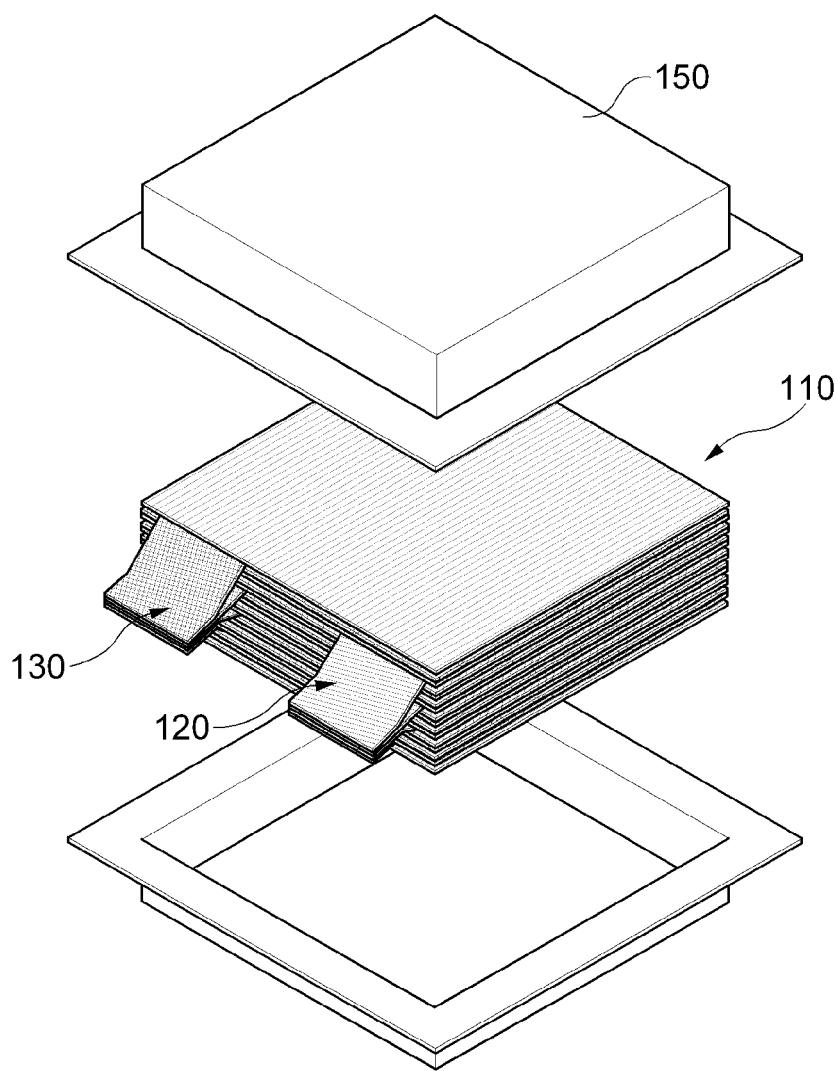
Figure 6:
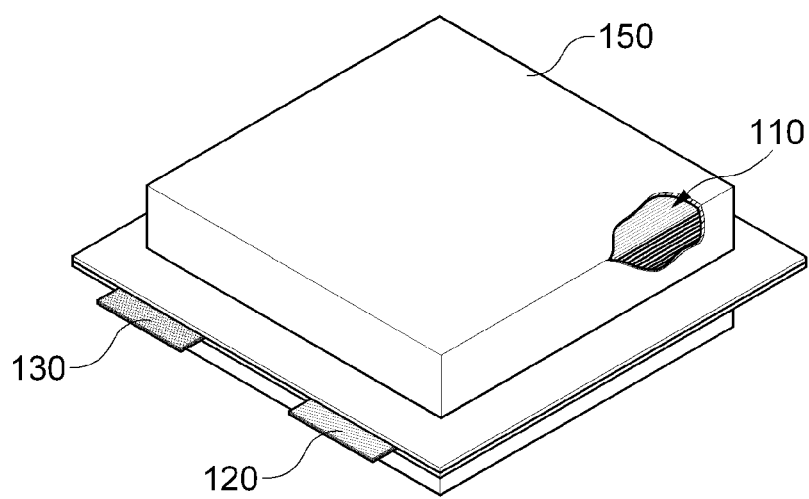

Referring to FIG. 5, the plurality of laminated anode terminals 130 and the plurality of laminated cathode terminals 120 are bonded to be integrated. Here, the bonding process may be ultrasonic welding, laser welding, or spot welding, and the embodiment of the present invention is not limited thereto. In addition, the bonded anode terminals 130 and the cathode terminals 120 may be separately connected to the external terminals.

After forming the electrode cell 110, the electrode cell 100 and the electrolyte are sealed by the housing 150 to form the lithium ion capacitor 100.

Specifically describing the sealing process of the electrode cell 110, first, two sheets of laminate films are provided to sandwich the electrode cell 110. Next, the two laminate films are thermal bonded so that the electrode cell 110 can be enclosed in the housing 150. At this time, the bonded cathode terminals 120 and anode terminals 130 are exposed from the housing 150 to be electrically connected to the external power supply.

Here, the thermal bonding process is performed along edges of the two laminate films, while remaining a gap through which the electrolyte is inserted into the electrode cell 110 interposed between the two laminate films. When the electrolyte is filled in the housing 150 through the gap, the electrolyte may be permeated into the electrode cell 110, that is, the separators 113, the anode active material layers 112b and the cathode active material layers 111b.

In addition, due to a potential difference between the lithium thin film 114 and the anode active material layer 112b, which are electrically insulated, the lithium ions can pass through the through-holes of the anode current collector 112a from the lithium thin film 114 to be pre-doped to the anode active material layer 112b.

Here, the electrolyte may include an electrolytic material and solvent. The electrolytic material may have a salt phase, for example, lithium salt, ammonium salt, or the like. The solvent may use non-proton organic solvent. The solvent may be selected in consideration of solubility, reaction with an electrode, viscosity, and a usable temperature range. The solvent may be, for example, propylene carbonate, diethyl carbonate, ethylene carbonate, sulfolane, acetonitrile, dimethoxy ethane, tetrahydrofuran, ethylmethyl carbonate, and so on. Here, the solvent may be used by mixing one or two or more. For example, the solvent may be used by mixing ethylene carbon and ethylmethyl carbonate. At this time, a mixing ratio of ethylene carbon and ethylmethyl carbonate may be 1:1 to 1:2.

After filling the electrolyte, the gap may be vacuum sealed to form the lithium ion capacitor 100.

Here, while the housing 150 has been described as being formed using a laminate film, the housing is not limited thereto but may use a metal can.

As described in this embodiment of the present invention, the lithium thin films are in direct contact with the anodes 112 laminated with the separators interposed therebetween to pre-dope lithium ions, reducing a pre-doping time. Accordingly, it is possible to improve productivity of the lithium ion capacitor.

In addition, since the pre-doping process of the anode 112 can be performed in the housing 150, there is no need to provide a globe box for performing the pre-doping process of the anode 112. Accordingly, since investment of production equipment can be reduced, manufacturing cost of the lithium ion capacitor can also be reduced.

Further, since the lithium thin film 114 is in direct contact with the anode 112 to pre-dope lithium ions, there is no need to migrate the lithium ions to the cathode current collector 111a. Accordingly, since the cathode current collector 111a may have a sheet shape with no hole, a resistance of the lithium ion capacitor can be reduced.

The lithium ion capacitor in accordance with an exemplary embodiment of the present invention shows good performance and has a large capacity at a high voltage range of 3.8V to 2.0V and a 60☐ cycle. Accordingly, since the lithium ions are pre-doped to the anode through two stages of pre-doping processes, energy density can be improved, and reliability can be secured.

Hereinafter, a lithium ion capacitor manufactured through a method of manufacturing the same in accordance with an exemplary embodiment of the present invention will be described in detail.

Figure 7:
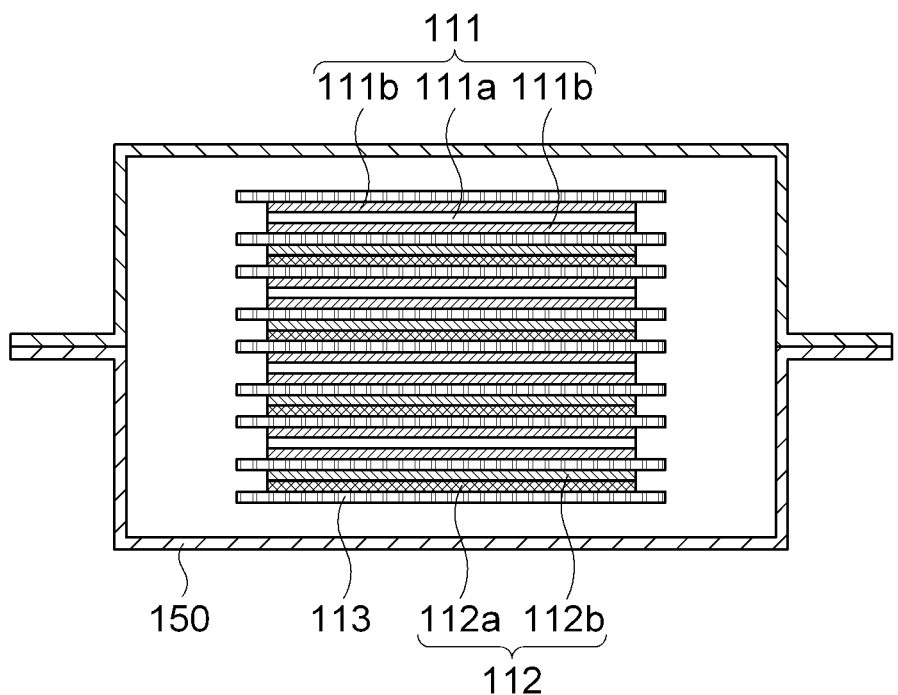
FIG. 7 is a cross-sectional view of a lithium ion capacitor in accordance with a second exemplary embodiment of the present invention.

FIG. 7 is a cross-sectional view of a lithium ion capacitor in accordance with a second exemplary embodiment of the present invention.

Referring to FIG. 7, the lithium ion capacitor in accordance with a second exemplary embodiment of the present invention may include an electrode cell 110 and a housing 150 (see FIG. 6) for sealing the electrode cell 110 immersed in an electrolyte.

Here, the electrode cell 110 may include cathodes 111 and anodes 112 alternately laminated with separators interposed therebetween.

The cathode 111 may include a cathode current collector 111a and cathode active material layers 111b disposed at both surfaces of the cathode current collector 111a. Here, since the pre-doping process of the anode 112 is performed in a state in which the lithium thin film 114 is in direct contact with the anode 112, there is no need to pass the lithium through the cathode current collector 111a, and thus, the cathode current collector 111a may have a sheet shape with no hole. Accordingly, it is possible to reduce an internal resistance of the lithium ion capacitor 100.

The cathode active material layer 111b may include a carbon material to which lithium ions can be reversibly doped and undoped, for example, activated carbon.

The cathode 111 may include a cathode terminal 120 disposed at one side of the cathode current collector 111a.

The anode 112 may include an anode current collector 112a and an anode active material layer 112b disposed at one surface of the anode current collector 112a. This is because, in order to reduce the resistance between the anode active material layer 112b and the lithium thin film during the pre-doping process of the anode, the anode current collector 112a is in contact with the lithium thin film.

Here, the anode current collector 112a may be formed of a foil formed of at least one of copper and nickel. The anode current collector 112a may have a mesh shape having a plurality of through-holes through which lithium ions can migrate to the anode active material layer 112b.

The anode active material layer may include any one carbon material to which lithium ions can be reversibly doped and undoped, for example, natural graphite, synthetic graphite, graphite carbon finer, non-graphite carbon, and carbon nanotube. At this time, since the lithium ions are pre-doped to the anode active material layer 112b and a potential of the anode active material layer 112b can approach 0V with respect to the lithium, energy density of the lithium ion capacitor can be increased to improve reliability of a charge/discharge cycle. At this time, the potential of the anode active material layer 112b may be variously changed according to application products through control of the pre-doping process of the lithium ion.

The anode 112 may include an anode terminal 130 disposed at one side of the anode current collector 112a.

Therefore, as described in the embodiment of the present invention, the anode includes the anode active material layer disposed on only one surface of the anode current collector. Accordingly, since the number of electrodes laminated on the lithium ion capacitor can be increased while maintaining a thickness of the conventional art, it is possible to an internal resistance of the lithium ion capacitor.

As can be seen from the foregoing, the lithium ion capacitor in accordance with an exemplary embodiment of the present invention can directly pre-dope lithium ions to the anode using the lithium thin film formed on the separator, reducing a pre-doping process time and uniformly doping the lithium ions to the anode.

In addition, the lithium ions can be uniformly and rapidly doped to the anode to enable manufacture of a high capacity of lithium ion capacitor, and reliability and productivity thereof can be secured.

Further, since the pre-doping process of the electrode can be performed in the housing in which the electrode cell is housed and there is no need to provide a separate globe box for performing the pre-doping process of the electrode, manufacturing cost of the lithium ion capacitor can be reduced.

Furthermore, the cathode may include a current collector having a no-hole structure to reduce an internal resistance of the lithium ion capacitor.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A method of manufacturing a lithium ion capacitor, comprising:
    forming a lithium thin film on one respective surface of each separator;
    making the lithium thin film in contact with an anode, and alternately disposing the anode and a cathode with the separator interposed therebetween to form an electrode cell, wherein
    the lithium thin film faces and contacts the anode,
    the anode comprises an anode current collector and an anode active material layer disposed on one surface of the anode, and
    the lithium thin film is in contact with the anode current collector; and
    enclosing the electrode cell and an electrolyte into a housing, and pre-doping lithium ions to the anode from the lithium thin film.

2. The method of manufacturing a lithium ion capacitor according to claim 1, wherein the anode current collector has a mesh type having a plurality of through-holes.

3. The method of manufacturing a lithium ion capacitor according to claim 1, wherein the cathode comprises a cathode current collector and cathode active material layers disposed on both surfaces of the cathode current collector.

4. The method of manufacturing a lithium ion capacitor according to claim 3, wherein the cathode current collector has a sheet shape with no hole.

5. The method of manufacturing a lithium ion capacitor according to claim 1, wherein the lithium thin film has a thickness range of 1 to 10 µm.

6. The method of manufacturing a lithium ion capacitor according to claim 1, wherein, in forming the lithium thin film on one surface of the separator,
    the lithium thin film is formed through a vacuum vapor deposition method.

* * * * *